Jan. 29, 1963 J. R. WILHELM 3,075,705
MODEL RAILROAD EQUIPMENT
Filed Aug. 13, 1959 9 Sheets-Sheet 1
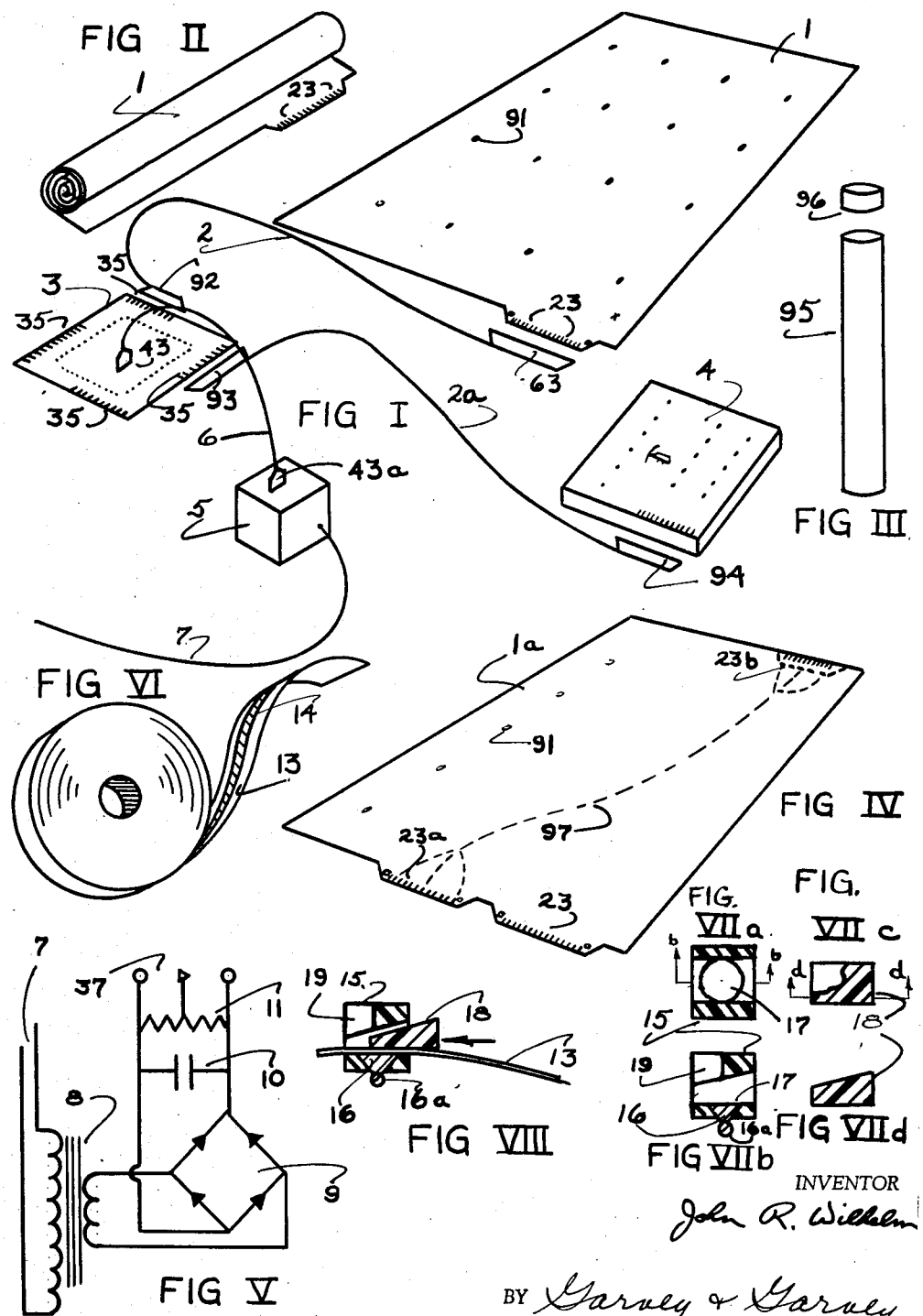
INVENTOR
John R. Wilhelm
BY Garvey & Garvey
ATTORNEYS

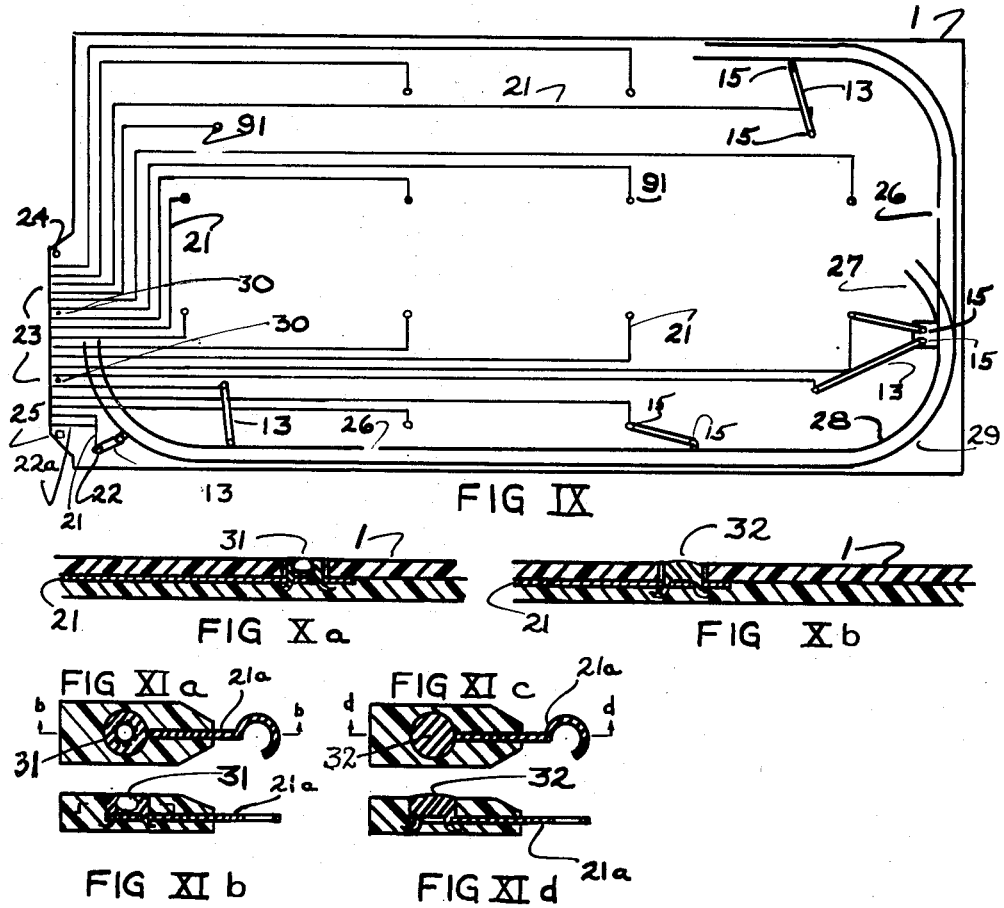

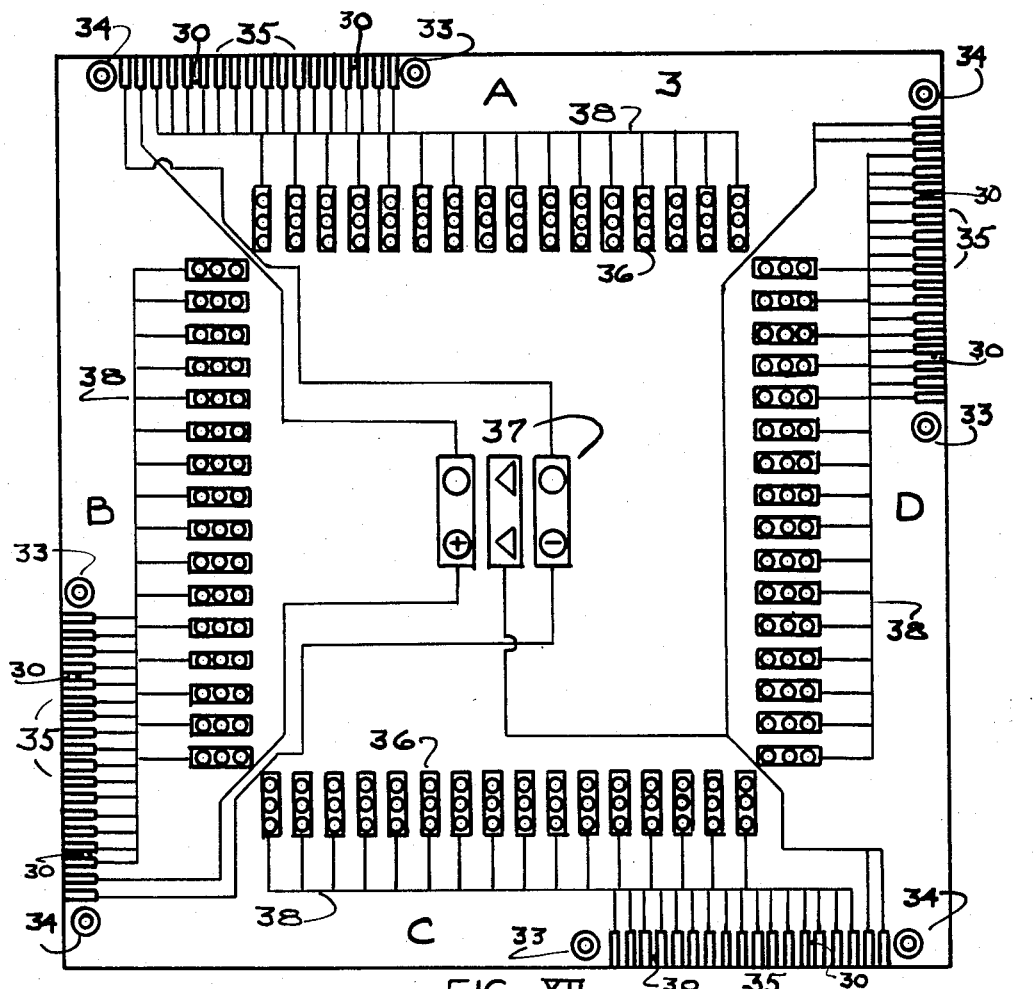
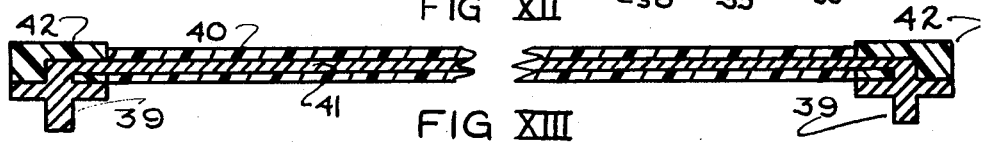
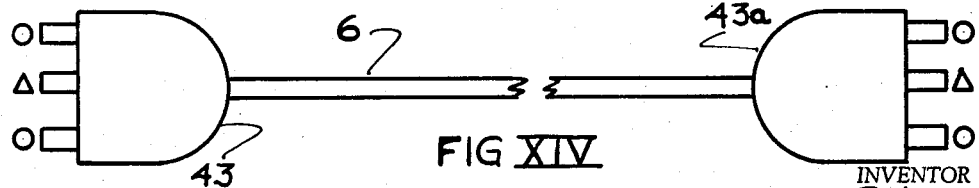

Jan. 29, 1963 J. R. WILHELM 3,075,705
MODEL RAILROAD EQUIPMENT
Filed Aug. 13, 1959 9 Sheets-Sheet 4
FIG XV
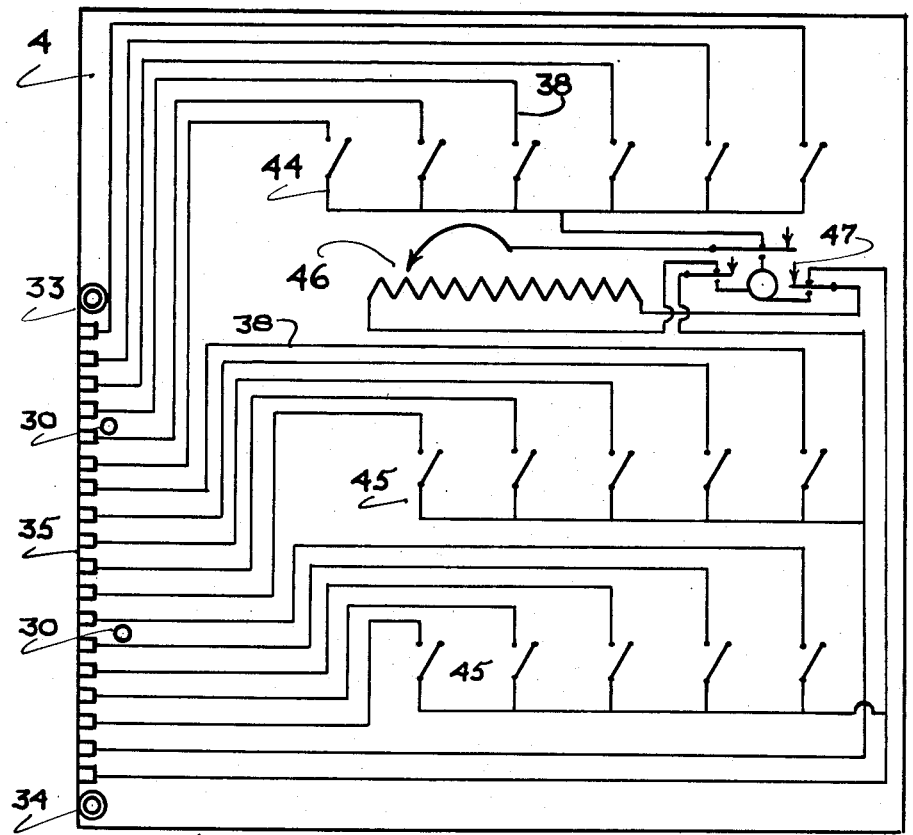
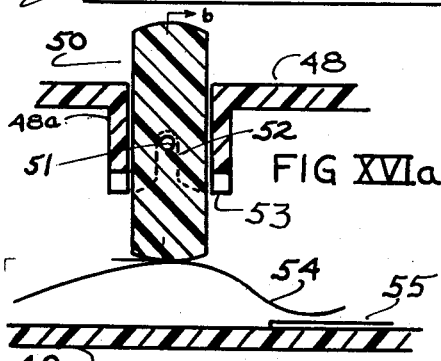
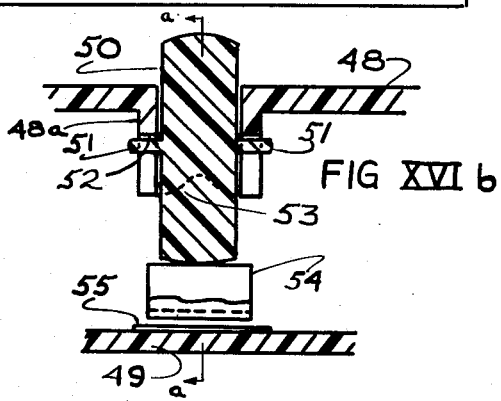
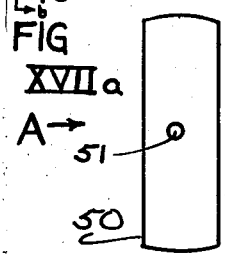
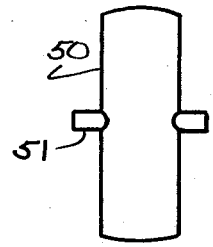
INVENTOR
John R. Wilhelm
BY Garvey & Garvey
ATTORNEYS Jan. 29, 1963  J. R. WILHELM  3,075,705
MODEL RAILROAD EQUIPMENT
Filed Aug. 13, 1959  9 Sheets—Sheet 5
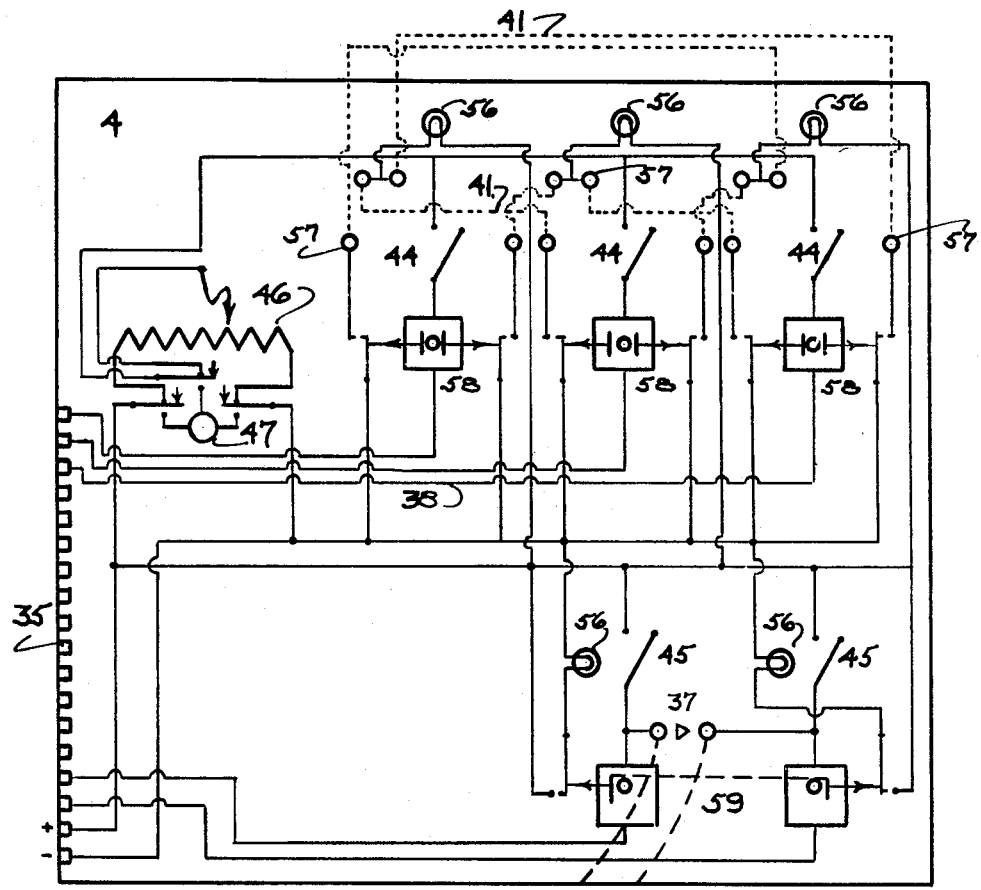
FIG XVIIIa
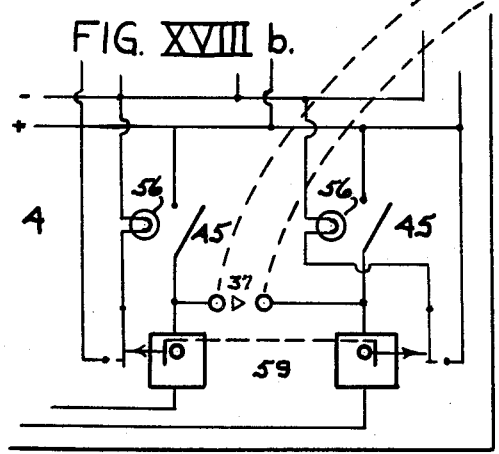
FIG. XVIII b.
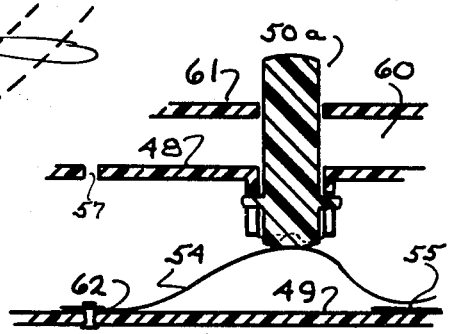
FIG XIX
INVENTOR
John R. Wilhelm
BY Garvey & Garvey
ATTORNEYS Jan. 29, 1963  J. R. WILHELM  3,075,705
MODEL RAILROAD EQUIPMENT
Filed Aug. 13, 1959  9 Sheets-Sheet 6
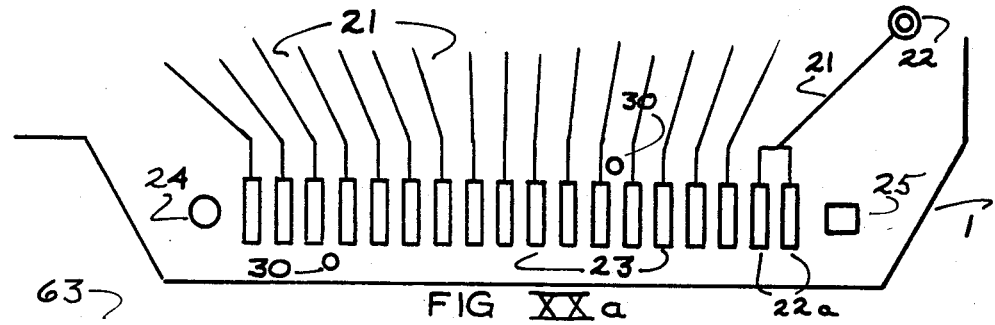
FIG XXa
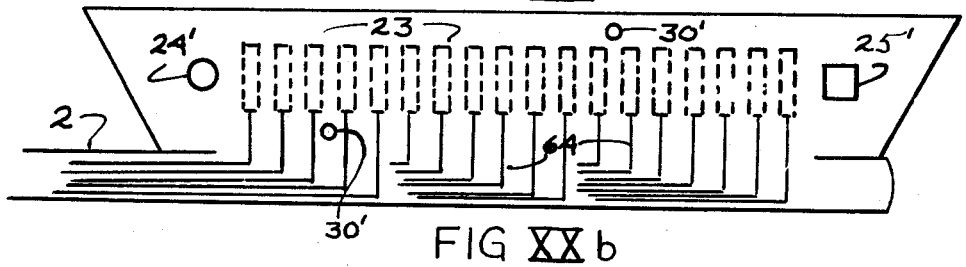
FIG XXb
FIG XXIa
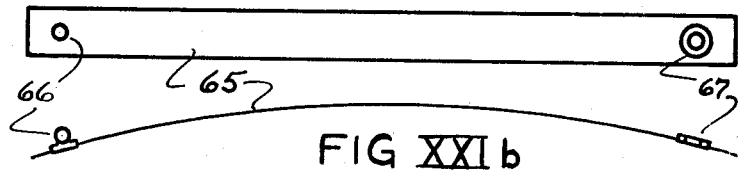
FIG XXIb
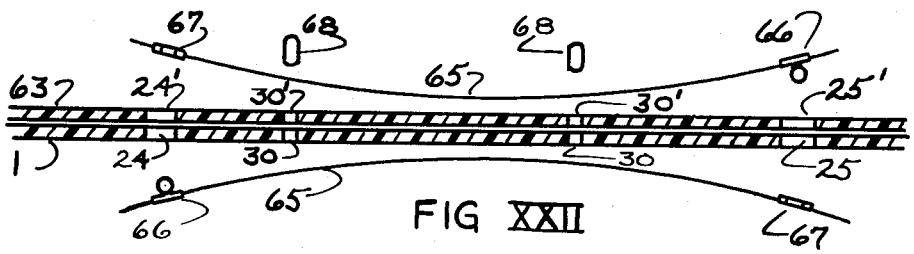
FIG XXII
INVENTOR
John R. Wilhelm
BY Garvey & Garvey
ATTORNEYS

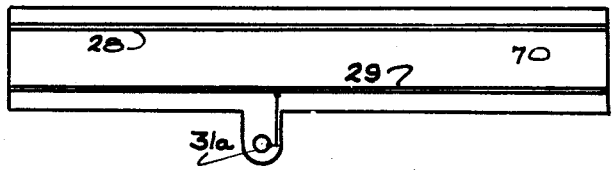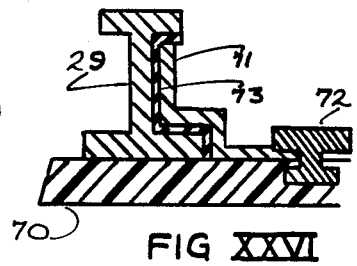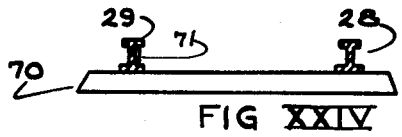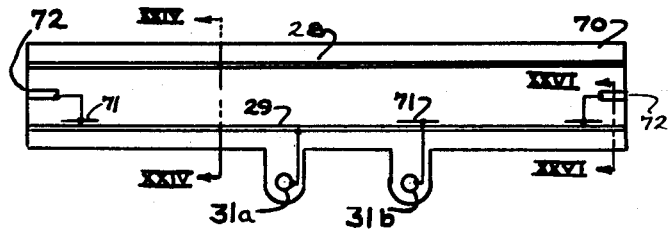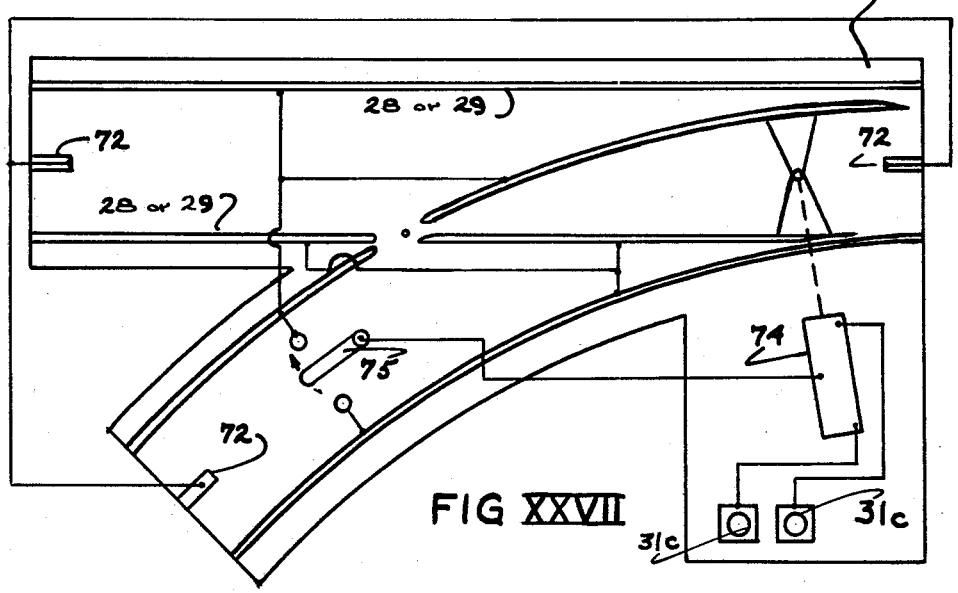

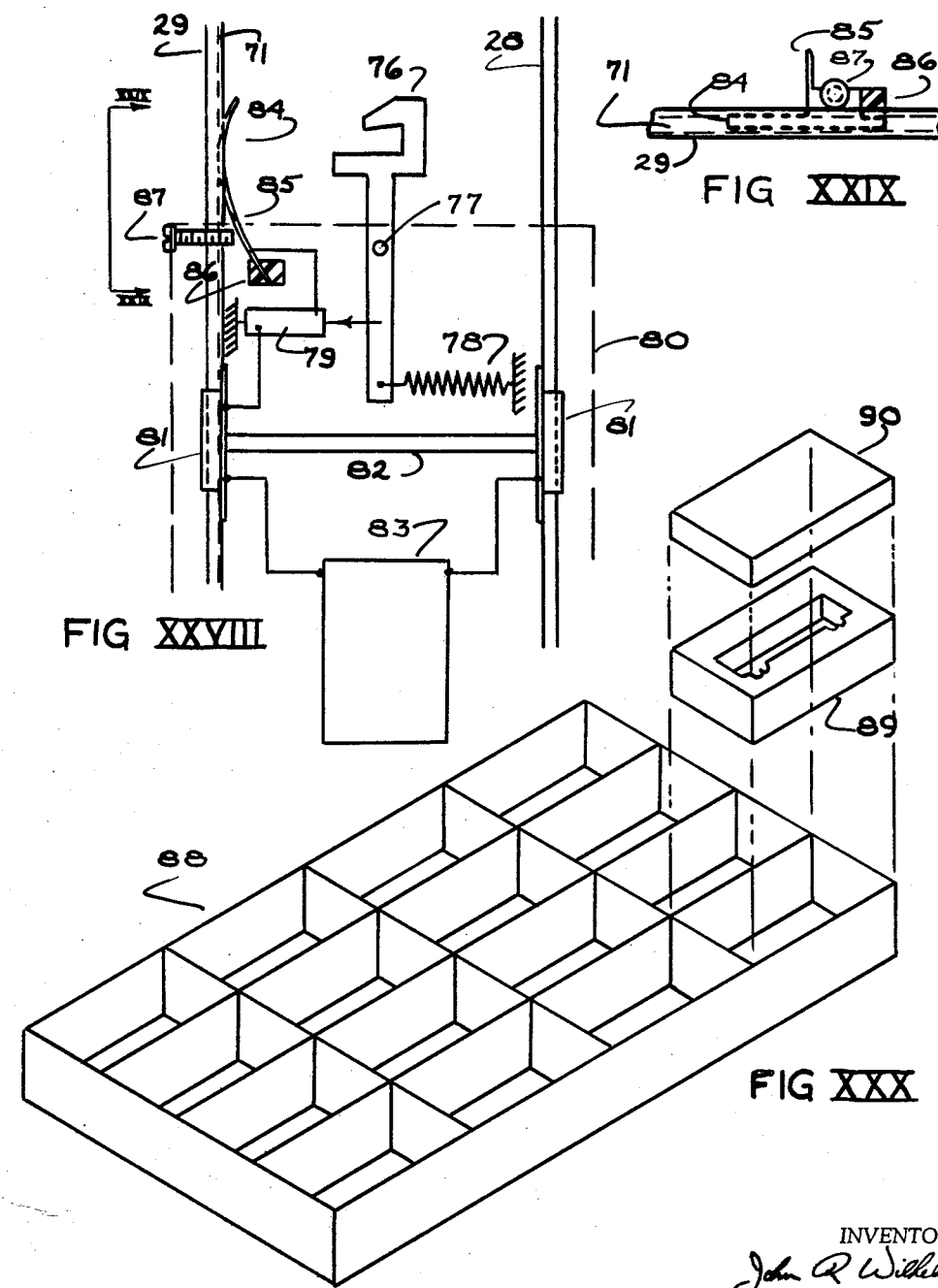

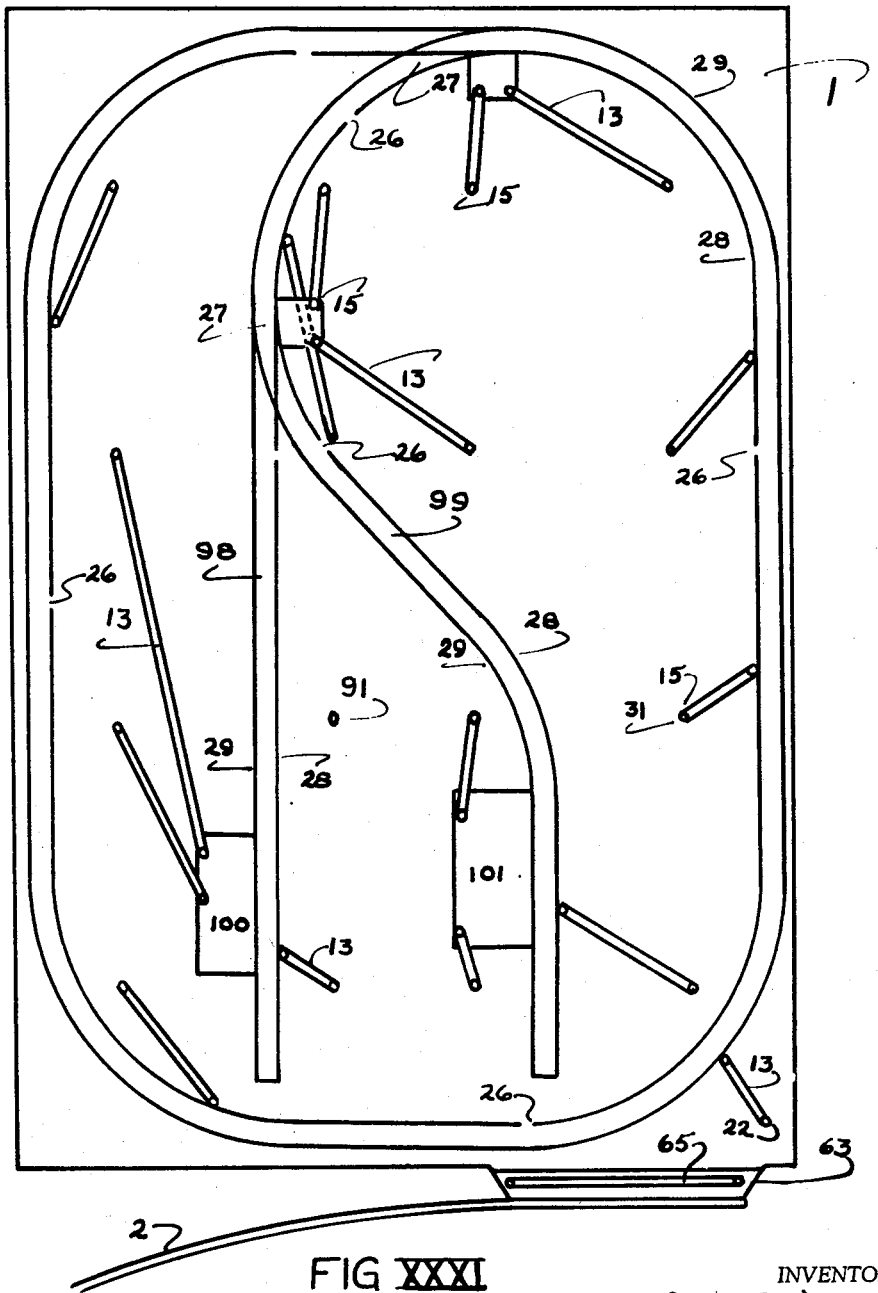
FIG XXXI 3,075,705
MODEL RAILROAD EQUIPMENT
John R. Wilhelm, 424 Whitestone Road,
Silver Spring, Md.
Filed Aug. 13, 1959, Ser. No. 833,500
15 Claims. (Cl. 238—10)

One of the objects of my invention is to provide a pre-wired flexible roll-up base of insulation material for a toy track assembly for toy trains for facilitating the rapid assembly, installation, and operation of a toy train system wherein a variety of different circut connections may be established at various locations through the roll-up base for completing different combinations of track layouts erected on the base.

Another object of my invention is to provide means for making selective electrical connections to toy track layouts erected upon a flexible base of insulation material that may be unrolled from a compact roll-up storage position into a flat plane for mounting a toy track system and providing power outlets at various location throughout the area thereof.

A further object of my invention is to provide a portable flexible base structure of insulation material for toy train track layouts having special terminal gripper fasteners located at selected positions throughout the area of the base for applying power to various track terminal points in the track layout through flexible circuit connectors embedded in the portable flexible base structure which are energized through detachable multiple junction connectors engageable with the terminal ends of the flexible circuit connectors at the marginal edges of the flexible base structure.

A further object of my invention is to provide a toy train system having a track circuit system divided into multiple sections where the system is adapted to be powered from an alternating current source, in combination with a rectifier for deriving direct current from the alternating current source for effecting selective two-way control of toy units in the system without reversing the polarity of all of the units, enabling a single common ground to be used for the system for distribution to the various track sections using a single lead to the system and minimizing the current flow in the individual track sections.

Another object of my invention is to provide a flexible roll-up base structure of insulation material for toy train track layouts including flexible circuit connectors and detachable multiple junction connectors leading to a junction box by which groupings of constant voltage and variable voltage switches can be effected to selectively energize the individual sections of the track by connection of the track sections through the circuit connectors with terminals in the flexible base structure.

Still another object of my invention is to provide a flexible roll-up base structure of insulation material for toy train track layouts having built-in track section circuits terminating in circuit terminals for quick connection to track sections supported on the base structure where the track section circuits are electrically connected through the base structure to a junction box wherein selective groupings of track sections may be effected for application of the necessary voltage through selective switches to energize individual track sections or equipment and including, in addition, relay operated signal lamps for indicating by selective energization the track sections of the system, which the toy train operable over the track system may be approaching, and including signal lamps indicating the positions of the switches.

Still another object of my invention is to provide an arrangement of flexible tape electrical connectors with associated end fasteners adapted to establish selective electrical connection with associated circuit connectors distributed in various locations throughout the surface of a flexible roll-up base of insulation material adapted, when unrolled, to serve as a mounting means for a toy train track assembly providing electrical energy at various locations in the flexible base.

Still another object of my invention is to provide a toy yard switching engine for toy train systems having an arrangement of coupling and uncoupling means for effecting a coupling and uncoupling operation between the toy engine and a cooperating toy car anywhere in a toy track layout where a unique form of third-rail track system is employed for controlling the coupling and uncoupling operation.

Still another object of my invention is to provide a toy track system assembly enabling anyone to understand, assemble, and operate a toy train system for both recreational and educational purposes in a wide variety of combinations, greatly increasing the value of toy track systems to the public generally.

Other and further objects of my invention are to provide a flexible mat for mounting track systems of a toy railway and providing interconnection for associated control and power supply equipment for the toy railway as set forth more fully in the specification hereinafter following by reference to the accompanying drawings in which:

FIG. I is a perspective view of the flexible mat and associated control and power supply equipment illustrated in juxtaposition prepared for mounting a toy track system on the flexible mat;

FIG. II is a schematic perspective view of the flexible layout mat being rolled into packaged or storage position;

FIG. III is a schematic perspective view of a cylindrical container and cover for the flexible layout mat when in rolled or storage position;

FIG. IV shows a modified form of the flexible layout mat of my invention similar to the mat shown in FIG. I with the addition of a cross-connection facility passing through the mat those leads necessary to establish connection with a similar mat as that shown in FIG. I for thus enabling two mats to be used in conjunction with each other for extending the area of the mats for use with an expanded toy track system;

FIG. V is a circuit diagram of the power supply unit used in conjunction with the flexible mat of my invention;

FIG. VI is a perspective view of a roll of masking tape having a ribbon constituting an electrical conductor extending along the center thereof for use in establishing connection with circuit terminals distributed over the area of the flexible mat;

FIG. VIIa is a horizontal sectional view showing one form of gripper used for fastening the tape to the layout mat for providing electrical connection with one of the terminals distributed throughout the area of the mat or with a similar terminal mounted on the individual track sections or operating equipment, and particularly showing the contacting surface of the fastener in top plan;

FIG. VIIb is a vertical sectional view through the fastening device of FIG. VIIa on line b—b thereof;

FIG. VIIc is a top plan view of the wedge of insulation material which coacts with the fastening device of FIG. VIIa, the view showing the wedge partially in section to illustrate clearly the insulated properties thereof;

FIG. VIId is a vertical sectional view through the wedge of FIG. VIIc on line d—d thereof;

FIG. VIII is a vertical sectional view through the assembled gripper fastener device showing the coaction thereof with the tape of FIG. VI, the view being taken substantially on line b—b of FIG. VIIa assuming the coacting parts to be in assembled relation;

FIG. IX is a plan view illustrating a partial layout of a toy track system on the flexible mat of my invention and showing the distribution of the electrical circuit leads through the mat and terminating in circuit terminals distributed over the area of the mat and at electrical contacts adjacent one end of the mat;

FIG. Xa is an enlarged sectional view taken through a portion of the mat of FIG. IX at the location of one of the circuit terminals therein and illustrating the structure of a gripper type terminal;

FIG. Xb is a view similar to the view shown in FIG. Xa, but illustrating the application of a flush type fastener for application at the various locations throughout the area of the mat shown in FIG. IX;

FIG. XIa is a horizontal sectional view through one form of adapter device for connection to the flexible tape of FIG. VI using the adapter of FIG. VIIa–d, to provide a convenient means for completing a circuit connection to a conventional power connector;

FIG. XIb is a vertical sectional view through the adapter of FIG. XIa, the view being taken substantially on line b—b of FIG. XIa;

FIG. XIc shows a modified form of adapter operative to establish connection with the tape of FIG. VI and a conventional power connector, the view being a horizontal sectional view through the adapter connector;

FIG. XId is a vertical sectional view taken substantially on line d—d of FIG. XIc;

FIG. XII is a plan view showing the functional electrical layout of the junction box used in the assembly of the system of my invention and showing particularly the circuit connection at the sides of the junction box;

FIG. XIII illustrates in cross-sectional view the jumper cables for use with the junction box and one form of the train control and dispatchers panel in the system of my invention;

FIG. XIV is a plan view of the polarized power cable for use between the junction box and power supply and between one form of the train control and dispatchers panel in the system of my invention;

FIG. XV is a schematic layout of the train control and dispatchers panel used in the system of my invention;

FIG. XVIa is a fragmentary cross-sectional view of one of the switches used in the train control and dispatchers panel of FIG. XV;

FIG. XVIb is a composite cross-sectional view on line b—b of FIG. XVIa and elevational view of the metallic spring of the control switch used in the train control and dispatchers panel assembly of FIG. XV;

FIG. XVIIa is a side elevational view of the plug actuator member of the control switch shown in section in FIGS. XVIa and XVIb;

FIG. XVIIb is a front elevational view of the plug actuator shown in FIG. XVIIa looking in the direction of arrow A of FIG. XVIIa;

FIG. XVIIIa shows a modified or optional form of the train control and dispatchers panel assembly embodying my invention and illustrating the assembly of three of the variable voltage switches and two of the constant voltage switches arranged in accordance with my invention;

FIG. XVIIIb shows a fragmentary portion of the circuits of a second similar train control and dispatchers panel used in conjunction with the train control and dispatchers panel of FIG. XVIIIa;

FIG. XIX is a vertical sectional view through a modified form of switch used with the train control and dispatchers panel arrangements of FIGS. XVIIIa and XVIIIb;

FIG. XXa is a schematic view of the circuit leads in the flexible mat which extend from circuit terminals distributed over the area of the mat to contact members adjacent the marginal edges of the mat for completing detachable electrical connection to circuits external to the mat;

FIG. XXb is a schematic plan view of the coacting connector carrying electrical connectors adapted to establish detachable electrical connection with the contact members at the edges of the mat illustrated in FIG. XXa;

FIG. XXIa is a plan view of a steel spring connecting device which is used in pairs for aligning and coupling together two companion groups of electrical contact members;

FIG. XXIb is a side elevational view of the spring device of FIG. XXIa;

FIG. XXII is a schematic cross-sectional view through a mat assembly embodying the connectors of FIGS. XXIa and XXIb, and showing particularly the manner in which the connectors serve to align the mat assembly and establish electrical connection at predetermined locations in the mat;

FIG. XXIII shows a two rail terminal section of a toy railroad track modified to utilize a gripper type fastener of my invention instead of the conventional power attachment device;

FIG. XXIV is a transverse sectional view through a length of a modified form of track of the type shown in FIG. XXV and illustrating the location of the electrical connection or third rail used to selectively energize a coupler on a switch engine or other device using a wiper described hereinafter;

FIG. XXV is a plan view of a modified form of track section which may be assembled on the mat of my invention and showing the inclusion of a third rail in the track section with the feature for interconnection of it to the next track section and the manner of establishing connection to the circuit terminals distributed throughout the area of the mat;

FIG. XXVI is an enlarged cross-sectional view through a fragmentary portion of the track section shown in FIG. XXV on line XXVI—XXVI thereof, the view showing the arrangement of the third rail with respect to the track section and the electrical connection of the third rail to the track connector which receives energy through a detachable connection made to circuit terminals in the supporting base;

FIG. XXVII is a plan view of a track turnout section employing electrical actuation and the circuit connections to electrical connectors which establish electrical connection with circuit terminals distributed over the area of the mat;

FIG. XXVIII is a schematic diagram showing the electrical wiring and the mechanical assembly for adapting a switch yard engine for operation on the mat structure of my invention;

FIG. XXIX is a fragmentary elevational view of the wiper assembly used in the structure of FIG. XXVIII, the view looking in the direction of line XXIX—XXIX of FIG. XXVIII;

FIG. XXX is a perspective view showing a compartmented stowage tray adapted to receive individually packaged holders for protecting the individual train units of a toy railway system for facilitating the protective stowage thereof in coaction with the conveniently rolled mat depicted in FIG. II adapted to be stowed in the cylindrical container of FIG. III; and FIG. XXXI is a plan view of the mat with a typical track arrangement thereon illustrating certain of the permutations and combinations of track layouts which may be made on the mat of my invention when unrolled to a flat condition with ample provision for power at circuit terminals distributed over the area of the mat.

My invention is directed to a new method of assembly, construction of, and merchandising plan for toy train equipment. Model railroading has long been a favorite with both the small boy (although seasonal) and a particularly patient type of adult. In one case the child derives satisfaction from watching a relatively simple train layout circle the toy track arranged beneath a Christmas tree, blowing the whistle, and varying the route through a pair of switches. This fascination lasts a week or two and then the toy railway system is put away for another year. On the other hand, there is the adult having a reasonable amount of space available to him and an infinite amount of patience who works countless hours on an installation of toy trains with intricate track layouts, scenic realism, etc. Interest in the former soon diminishes for lack of growth potential to match mental development and interest in the latter is seldom achieved because of the complexity, space requirements, and cost involved. My invention provides such convenience of packaging, stowage, assembly, and use of train sets as to provide a means of reviving interest in train sets and increasing the commercial distribution of such train sets. I provide a flexible mat of insulation material, which may be readily unrolled from a packaged, stowed condition onto a flat surface to provide a base for a toy train set with individual circuit terminals distributed over the area of the mat to provide power at the required positions for various track layouts with connection means established adjacent the marginal edges of the mat to power supply, train control and dispatchers panel, and junction box assemblies facilitating the rapid assembly of the equipment for prompt and convenient use. I provide special means for completing circuit connections between track sections and circuit terminals distributed over the area of the mat and special means in the junction box, train control panel, and the power supply unit for increasing the operating efficiency of the system. The assembly is conveniently energized from the conventional house lighting alternating current circuit and includes rectifier means by which direct current is obtained for those units of the toy train system requiring reversal in polarity for effecting control. As a protective measure for packaging the train set, I provide a compartmented tray and molded styrofoam block units individually shaped to receive the different units of a train set for packaging the equipment in as convenient a manner as is possible. As heretofore explained, the flexible mat of insulation material may be rolled into or unrolled from a package to provide the base for the track system of the toy train set.

Referring to the drawings in more detail, reference character 1 designates the layout mat of flexible insulation material which may be unrolled from the rolled condition indicated in FIG. II to the flat plane position indicated in FIGS. I, IV, IX, and XXXI. Circuit connections extend through or on the flexible sheet of insulation material 1 from circuit terminals indicated generally at 91 to the terminating contact members 23 which preferably consists of exposed metallic conducting contact strips in the marginal edge of the mat to which electrical connection may be made through detachable and attachable connector 63, carrying similar coacting conducting contact strips 23 thereon, through the interconnecting flexible cables 2 extending to the junction box 3, also equipped with detachable connection facilities indicated at 35 similar to the contact strips 23 and coacting with detachable and attachable plugs shown at 92 and 93 in a manner similar to plug connection 63. The plug connector 93 extends through flexible cable 2a to the plug connector 94, which is detachably connectable to the train control and dispatchers panel 4 to complete the electrical circuit between the contacts 35 of the junction box and the contacts 35 of the train control and dispatchers panel. The junction box 3 also provides a pair of polarized three jack plugs 37, which connects through the polarized plug 43 connecting through cable 6 and polarized plug 43a as shown more clearly in FIGS. XII and XIV with the power supply unit 5, which, in turn, connects through lead 7 to the conventional 115 volt A.C. domestic power supply. The units and the layout mat thus assembled are ready for the installation of the track system on the layout mat 1. The assembly may be accomplished rapidly, for as soon as the layout mat 1 is withdrawn from the container 95 having detachable cover 96 shown in FIG. III, and unrolled into a substantially flat plane on a supporting surface the assembly is ready for erection of the track system thereon which consists merely of laying the track system on the mat-like structure.

There are occasions where the track system must be so expanded that the layout provided by mat 1 is insufficient to care for the entire track system, in which event an extension mat 1a as shown in FIG. IV is provided, in which a multiple cable 97 extends through the mat 1a from connectors or contact members 23a at one end of the mat to connectors or contact members 23b at the other end of the mat. When mats 1 and 1a are joined, contact members 23b of mat 1a individually connect with the corresponding contact members 23 of mat 1. Two cables indicated by reference character 2 are then respectively connected to members 23 and 23a of mat 1a and sides C and D of the junction box 3 to individually connect the contact members or elements 35 of the junction box to the corresponding contact elements 23 and 23a of the mat. There is, then, in effect, one continuous expanse of mat on which the track system may be installed.

FIG. V shows the circuitry for the power supply unit 5 in which reference character 8 is a step-down transformer having its primary connected through lead 7 to the domestic 115 volt A.C. power supply, and the output of the transformer connected to the direct current rectifier circuit 9 having a filter condenser 10 connected across the output thereof and a potentiometer 11 connected across the output of the filter to the polarized three contact receptacle 37 to receive the plug 43a of the power cable 6.

In order to make quick electrical connection with the sections of track and other equipment mounted on the base 1 or 1a I provide a special type of connector using flexible masking tape 13 with a metallic conducting ribbon 14 extending along the center thereof as illustrated in FIG. VI. Special fastening devices are provided between connectors and the conducting tape so that the necessary lengths of connecting tape may be readily selected. One form of connecting device and gripper for the tape is illustrated in FIGS. VIIa, VIIb, VIIc, VIId, and FIG. VIII, in which a molded plastic fastening device is provided through the center thereof for passage of the conductive tape 13 which is secured in position by the plastic wedge 18 which clamps the conductive strip 14 on tape 13 against the metallic surface 17 of the gripper type fastener 16 which terminates in the beaded or male snap-type and 16a for making quick electrical connection with the selected one of the circuit terminals 91 such, as female type snap fasteners 31 distributed over the surface of the mat 1 as will be hereinafter described in more detail. In order to effect removal of wedge 18, a slot 19 is provided in the molded plastic fastening device 15.

In FIG. IX I have shown the several electrical connectors 13 snapped into mechanical and electrical connection with terminals on the mat 1 from locations 91. At these locations 91 various types of gripper fasteners may be employed, such as the types represented more clearly in FIGS. Xa, Xb, XIa, XIb, XIc, and XId. In using either of these arrangements, that is, the female snaps or gripper type fastener 31 or the flush type contact 32 arranged to stick into connection with the conductive path 14 of the tape 13 through the properties of the tape 13 to stick to the surface of the mat 1. I have represented an electrical conductor 21 located between laminated layers of the plastic roll-up material from which the mat 1 is formed and extending from the connectors 23 adjacent one end of the mat to the circuit terminals distributed over the area of the mat. Reference character 21a represents a rigid electrical connector extending from conductor 21 to permit the attachment of this special connector to a power tap. Provision is made for an electrical tap 22 designated as ground and differentiated visually from all of the other connectors and extending from a contact member 22a in the group of contact members 23 which coact with the associated plug 63. To provide for arrangement of contact members 23 and 22a on the end of the mat 1, the mat 1 is extended at one end thereof and there are round and square holes 24 and 25 provided beyond the limits of the contact members 23 and 22a to assist in the alignment of the plug 63 (FIG. XXb) with the contact members in the end of the mat 1. Plug 63 carries round and square apertures 24' and 25' which are alignable with and fastenable through correspondingly shaped apertures 24 and 25 in the end of mat 1. The track system is assembled on the flattened mat 1 and consists of sections of track of the type represented in FIGS. XXIII—XXVII indicated electrically in FIG. IX as including an electrical break 26 in the power track adapted to coact with a non-conducting shoe. The track turnout of FIG. XXVII has been represented at 27 in FIG. IX. The power rail of the track is indicated at 28 and the ground rail of the track is indicated at 29.

In addition to the sets of alignment apertures 24 and 25 in the mat 1 and the apertures 24' and 25' in the plug 63 I also provide cable alignment holes 30 in the mat 1 and 30' in the plug 63.

In FIG. XII I have shown the functional electrical layout of the junction box containing in sides A and B the train control and dispatchers panel connections and in the sides C and D I have shown the layout mat connections to mat 1 or mats 1, and 1a. In FIG. XII there is a female gripper or snap connection type device 33 molded into the plastic board of the unit and there is a male gripper or snap connection type device 34 molded into the plastic board in the arrangement shown. There are exposed metal contacts 35 for cable attachments. Metal plates 36 are provided containing three conventional type jack plugs as schematically indicated in each plate. As heretofore explained, there are jack plugs of polarized type 37 arranged centrally of the junction box. The individual wiring between each contact 35 and the jack plugs 36 is shown at 38. The arrangement of the sets of contacts and the jack plugs is symmetrical around the sides of the junction box.

In FIG. XIII I have shown the jumper cables for use with the junction box and the train control and dispatchers panel. These jumper cables include metallic jacks 39 interconnected through electrical conductor 41 covered by insulation 40 and terminating in the molded plastic caps 42. These cables enable a variety of selective connections to be made between jack plugs in plates 36 of side A or B and jack plugs in plates 36 of side C or D to distribute the selected type power to selected terminals 91 on the mat surface. They also have application in connecting indicator lamps in the modified train control and dispatchers panel.

The polarized power cable 6 for use between the junction box and the power supply and between two train control and dispatchers panels is shown in FIG. XIV as including polarized plugs 43 and 43a and adapted to be connected in FIG. I.

FIG. XV shows a schematic layout for the train control and dispatchers panel where single pole, single throw switches are illustrated at 44 spring loaded for operation under conditions involving "press to make" and "spring release" used for selective distribution of variable voltage from potentiometer 46 to selected circuit terminals 91 on the mat surface depending upon the selected jumper wiring between the plates 36 of sides C—D and A—B of the junction box. Reference character 45 indicates a group of switches identical to the switches 44 but arranged to distribute constant voltage to selected circuit terminals 91 depending upon the jumpering arrangement in the junction box. A jack plug receptacle 47 is provided to facilitate use of a foot control potentiometer in lieu of potentiometer 46. The insertion of a jack disconnects the three leads of the built-in potentiometer and substitutes the leads to the foot potentiometer.

Power is thus supplied from power supply unit 5 to the junction box 3 through cable 6 and polarized plugs 43 and polarized jack plugs 37. From thence power is conveyed from side A or B of the junction box to the train control and dispatchers panel 4 by way of cable 2a and plug connectors 93 and 94. If two mats 1 and 1a are used then two dispatcher panels 4 may be used with the cables from the panels 4 connected to sides A and B, respectively, of the junction box. The power is then conveyed through the various make and break switches By selective placement of jumpers from the jacks of side A or B of the junction box through the same cable 2a, by which it was conveyed to the train control panel. The selectively available variable and constant power from the control panel is then made available at the jack plugs at plates 36 of side A or B of the junction box. By selective placement of pumpers from the jacks of plates 36 on side A or B to the jacks of plates 36 on side C or D of the junction box the selected type of power is connected to selected output contact elements 35 on side C or D of the junction box from which it is conveyed to the selected circuit terminals 91 on the mat surface by means of cable 2, plugs 92 and 63, contact members or elements 23 and conductors 21 within the mat-like structure. Thus by selective depression of the button switches at the train control and dispatchers panel, power of a selected type, either constant voltage or a variable voltage, is supplied to selected output circuit terminals 91 on the mat to supply central power to various sections of a train track system and its associated accessories.

The switch structure employed is shown more clearly in FIGS. XVIa, XVIb, XVIIa, and XVIIb, wherein the molded top of the train control and dispatchers panel indicated at 4 is indicated by reference character 48 while the bottom of the cabinet of the apparatus is indicated at 49. A molded plastic plug actuator 50 extends through the top 48 of the cabinet as shown contained in sleeve 48a and is provided with protrusions 51 to guide and/or lock the plug with respect to slots in the sleeve 48a shown at 52 and 53. A metallic spring 54 pivoted to the bottom 49 of the cabinet is continuously biased upwardly and tends to urge plug 50 upwardly with spring 54 out of contact with the fixed metallic contact 55. Depression of the plug 50 flattens out spring 54 and establishes contact with electric contact 55. Rotation of the plug 90° engages the guides 51 in the shallow slots 53 and locks the switch in the engaged position.

Referring to FIGS. XVIIIa and XVIIIb I have shown a partial view of a modified version of the train control and dispatchers panel showing only three of the variable voltage switches 44 and two of the constant voltage switches 45. Indicator lamps are shown at 56 for operation from 24 volts D.C. and there are jack receptacles 57 for use with the junction box jumper cable FIG. XIII. Polarized relays 58 actuated by the current through switches 44 are provided. Current in one direction actuates one side of the relay while current in the opposite direction actuates the other side of the relay. The relay is closed on one or the other sides thereof whenever current is flowing. The relay opens when the current ceases. Thus, according to the wiring arrangement made by the individual in advance, the energization of one track section and the resultant train movement will cause an indicator lamp to light signifying which switch must be depressed to continue the motion of the train. Relays 59 coact when operated and locked by the flow of current. The current in the second half of the relay closes its half of the circuit and releases the first half. FIG. XVIIIb shows a corner of a second train control and dispatchers panel for illustrating how two train control and dispatchers panels will function together. Actuating one switch 45 not only positions the track turnout 27 and lights an indicator light on the panel which operated the control to position the turnout but makes the correct indication on the associated train control and dispatchers panel.

In FIG. XIX I have a fragmentary cross-sectional view of a modified arrangement of switch associated with an enclosed cablerun 60 over the train control and dispatcher panel in which the jumper cables, indicator lamps, etc. are located. Panel 61 indicates a removable panel assembly to permit changes in the jumper cables, lamps, etc. Reference character 50a indicates an extended length of molded plastic plug for operating the switch. Rivet 62 indicates the means for pivotally mounting the leaf spring 54 with respect to the bottom 49 of the panel.

In aligning the plug of FIG. XXb with the end of the mat 1 (FIG. XXa), for attaching cable plugs to the junction box and train control and dispatcher panels, and for attaching mat 1 to mat 1a, I may employ the steel strip connecting device of FIG. XXIa, in pairs, where the strip of steel constituting the device is shown at 65 normally biased into a smooth curve more clearly shown in FIG. XXIb. One end of the strip carries the male gripper connector 66 and the opposite end of the strip carries the female gripper connector 67. When the plug 63 is moved into position over the projection of the end of mat 1 so that apertures 24 and 24' and 25 and 25' are aligned and the cable alignment holes 30 and 30' also aligned, the plug and the mat 1 may be maintained in metal to metal contact by coupling means utilizing two of the spring steel connecting devices of FIG. XXIa and XXIb. In effecting the alignment, a plastic aligning plug 68 is employed and passed through the cable alignment holes or slots 30 and 30'. Using a pair of the connecting devices 65, the male gripper connectors 66 are passed through the square holes 25 and 25' and the round holes 24 and 24' from opposite directions in diagonally opposite positions viewed from the section shown in FIG. XXII and engaged with the female connectors 67 for thereby maintaining the plug 63 in engaged position with the mat 1.

In FIGS. XXIII and the associated figures through FIG. XXVII, I have shown typical track sections which are assembled on the flat base 1 or 1a. Each track unit has been represented as including a base section 70 on which tracks having rails 28 and 29 are mounted. In FIG. XXIII rail 29 is shown electrically connected to the circuit terminal 31a which corresponds with the construction employed in the terminal 31 or 32 in the mat 1 facilitating the establishment of a connection between the circuit terminals 31 and 31a through the conductive tape of the type shown in FIG. VI.

FIG. XXIV is a cross-sectional view through the track section taken on line XXIX—XXIV of FIG. XXV and illustrates the location of the special third rail 71.

In FIG. XXV I have shown a plan view of a modified form of track section used as a switch yard track, that is, having a third rail 71 where electrical connectors 72 are arranged to use the conventional track joiner shoe but in the inverted position for the purpose of passing the third rail current from section to section. In this arrangement the special third rail 71 is connected to a terminal 31b in the insulated bass section 70 to isolate the third rail and enable separate electrical connection to be made thereto. This will be clear from an examination of FIG. XXVI which is a transverse section taken on line XXVI—XXVI of FIG. XXV from which it will be seen that there is an insulation sheet 73 such as a coat of lacquer or insulation sheet material applied against one side of the rail, such as rail 29, for completely insulating the third rail 71 from rail 29. It is important that this insulation be applied to the grounded track.

In FIG. XXVII I have shown a track turnout section which includes passing-through connectors for the third rail 72. Reference character 74 schematically indicates a center-tapped solenoid for turnout operation. The center tap is connectible to either rail through switch 75, depending upon which rail is designated as ground. In the assembly shown in XXVII the circuit terminals for the unit are shown at 31c.

In FIG. XXVIII the wiring and the schematic arrangement for a switchyard engine which can couple or uncouple anywhere on the special freight yard third rail tracks, explained in FIGS. XXV–XXVII, has been shown. Reference character 76 refers to a coupler lead carried by the switchyard engine, the coupler lead being pivoted at 77 and spring-biased by means of spring 78 to a neutral position with respect to the armature of an operating solenoid 79 and the coupled position with respect to another coupler. The switching engine is designated in outline at 80 including wheels 81 journaled upon axle 82 of non-conducting material. The propulsion motor on the switchyard engine is represented at 83. The switchyard engine carries an electrical spring wiper 84 which is aligned with the third rail 71 on the rail 29 but which coacts with a positioner 85 used to hold the wiper 84 off the third rail 71 while placing the engine on the track. There is a mechanical holder for the wiper 84 shown at 86. A set screw 87 in the switchyard engine is provided for adjusting the wiping pressure of the electrical spring wiper 84. After the switchyard engine is placed on the track, the set screw 87 is retracted to allow the electrical spring wiper 84 to establish sliding connection with the third rail 71. In FIG. XXIX I have shown a fragmentary detailed view of the electrical spring wiper 84 and the manner in which the spring wiper 84 establishes sliding contact with the third rail 71.

I have heretofore explained the advantages arising out of the roll-up properties of the mat on which the track is assembled. As part of the portable assembly of the equipment I provide a stowage tray represented in FIG. XXX at 88 comprising a molded plastic tray having individual and identical compartments and a fitted cover not shown. I provide individual molded styrofoam blocks 89 formed to contain each piece of rolling stock, track, turnouts, etc., with a top 90 of molded styrofoam to match the block 89 and provide an enclosing protective package for the rolling stock and other items to be protected. The pieces of rolling stock, and other items, are protected against shock or injury by reason of the packaged assembly which at the same time solves the stowage problem for safely maintaining the toy train components when not in use.

In FIG. XXXI I have shown a typical track layout embodying my invention in which it will be seen that the mat 1 is capable of serving as a mounting means for various permutations and combinations of track arrangements and which I have illustrated herein as including the spurs 98 and 99, one of which leads to the coal-loader unit 100 and the other of which leads to the cattle-loader unit 101, all of which are equipped with connectors which lead to convenient circuit terminals in the surface of the mat as illustrated. All of these circuits are readily completed from the plug 63 connected through the interconnecting cables 2 as illustrated. Other combinations of track are readily set up on the mat 1, the important feature being that there are adequate circuit terminals 31 available throughout the surface of the mat 1 to which electrical connection may be made from the track sections or the toy train equipment to provide any variable or constant voltage under control of the switches in the train control and dispatcher panels or in several train control dispatcher panels by interconnection in the junction box.

While I have described my invention in certain of its preferred embodiments I realize that modification may be made and I desire that it be understood that no limitations upon my invention are intended other than may be imposed by the scope of the appended claims.

What I claim as new and desire to secure by Letters Patent of the United States is as follows:

1. An accessory for supporting and supplying energy to a toy train track system requiring individually selectively energized electrical circuits comprising, a flexible mat-like structure of insulation material capable of being rolled to reduce the size thereof for storage, said flexible mat-like structure when unrolled into a substantially flat plane upon a supporting surface forming a supporting base adapted to receive and support a toy train track system assembly on the upper surface thereof, a plurality of electrical circuit terminals distributed over the upper surface of said mat-like structure, electrical circuit leads within the mat-like structures extending from said terminals and terminating in electrical contact elements adjacent a marginal edge of said mat-like structure, coacting means attachable to said electrical contact elements for selectively electrically energizing said circuit leads and circuit terminals, and means selectively attachable to said circuit terminals and adapted to be connected with the toy train track system assembly for applying electric power thereto from said circuit terminals.

2. An accessory for supporting and supplying energy to a toy train track system as set forth in claim 1 in which said last mentioned means comprise flat flexible tape members having a conductive path thereon terminating at one end in a detachable electrical connection engageable with selected of said circuit terminals distributed over the upper surface of said mat-like structure and terminating at the opposite end in a detachable fastener operative to engage and make electrical connection with the toy track system.

3. An accessory for supporting and supplying energy to a toy train track system as set forth in claim 1 in which said circuit terminals on the upper surface of said mat-like structure are snap type fasteners and wherein said means selectively attachable to said circuit terminals and adapted to be connected with the toy train track system assembly include coacting snap fasteners adapted to establish quick detachable connection with the aforesaid snap fasteners.

4. An accessory for supporting and supplying energy to a toy train track system as set forth in claim 1 in which said coacting means attachable to the electrical contact elements adjacent a marginal edge of said mat-like structure are detachably interlocked with the contact elements adjacent the marginal edge of said mat by coacting transverse locking members extending normal to the plane of said mat and said contact members.

5. An accessory for supporting and supplying energy to a toy train track system as set forth in claim 1 in which there is a projection on one marginal edge of said mat-like structure for supporting said contact elements, corresponding contact elements included in said coacting means, and wherein there is a support member substantially corresponding in contour with the contour of said projection for mounting said corresponding contact elements of said coacting means, and wherein there are interlocking means extending through said projection and through said support for maintaining the corresponding contact elements of said coacting means in electrical connection with said contact elements.

6. An accessory for supporting and supplying energy to a toy train track system as set forth in claim 1 in which a flat projection is provided on one end of said mat-like structure for mounting said contact elements, corresponding contact elements included in said coacting means, flat supporting member for mounting said corresponding contact elements of said coacting means, said flat projection and said supporting member each containing matching correspondingly-shaped apertures therein adapted to be aligned one over the other when said corresponding contact elements of said coacting means are connected with said contact elements, and coupling means comprising a pair of resilient strips, one of said strips adapted to extend under said flat projection and the other of said strips adapted to overlie said supporting member, both of said strips being alignable with the the apertures in said projection and in said supporting member, and means carried by the respective strips and extendible through the aforesaid aligned apertures and interengageable for maintaining said strips in coupled relation with said projection and said supporting member.

7. An accessory for a toy train track system as set forth in claim 1 in which there is a flat projection on one end of said mat-like structure for mounting said contact elements and wherein there is a correspondingly-shaped flat supporting member for mounting said coacting means, said flat projection and said supporting member each containing matching correspondingly-shaped apertures therein, certain of the aligned apertures being polygonal in section and others of said apertures being circular in section, adapted to be aligned one over the other when said coacting means are connected with said contact elements and coupling means comprising a pair of resilient strips, one of said strips adapted to overlie said flat projection and the other of said strips adapted to extend under said supporting member, both of said strips being alignable with the apertures in said projection and in said supporting member, and means carried by the respective strips and extendible through the aforesaid aligned apertures and interengageable for maintaining said strips in coupled relation with said projection and said supporting member.

8. An accessory for a toy train track system as set forth in claim 1 in which there is a flat projection on one end of said mat for mounting said contact elements and wherein there is a correspondingly-shaped flat supporting member for mounting said coacting means, said flat projection and said supporting member each containing matching correspondingly-shaped apertures therein, certain of the aligned apertures being polygonal in section and others of said apertures being circular in section, adapted to be aligned one over the other when said coacting means are connected with said contact elements and coupling means comprising a pair of resilient strips, one of said strips adapted to overlie said flat projection and the other of said strips adapted to extend under said supporting member, both of said strips being alignable with the apertures in said projection and in said supporting member, and two-part snap fasteners carried by said strips and projectable through the respective circular and polygonal-shaped apertures in said flat projection and in said supporting member for coupling said projection and said supporting member together.

9. An accessory for supporting and supplying energy to a toy train track system as set forth in claim 1 in which said last mentioned means comprises a flat tape having a conductive path thereon and a detachable connector for each end of said tape comprising a recessed block of insulation material, an electrically conductive connector disposed within said block for receiving said tape and establishing electrical connection with the conductive path thereon and a wedge of insulation material insertable into said recessed block for clamping the conductive path of said flat tape into electrical connection with the connector whereby the electrical connector on one end of said tape may be selectively electrically connected with the circuit terminals distributed over the area of the mat and the electrical connector on the other end of said tape may be electrically connected with the toy track system assembly.

10. An accessory for supporting and supplying energy to a toy train track system as set forth in claim 1, in which said coacting means includes a train control and dispatcher's panel, a junction box and a power supply unit, pre-wired circuits for said panel, said junction box and said unit terminating in electrical contact members on each of said units, and detachable plug like connectors extending between said contact members of the various units for completing circuits between the various units and through said mat.

11. An accessory for a toy train track system as set forth in claim 1 in which said circuit terminals are disposed in lineal rows over the area of said mat with one row spaced one from another row for distances allowing installation of a toy train track system assembly layout therebetween, with the means extending from said toy track system assembly to said circuit terminals disposed on either side of the toy train track system assembly layout and connecting with the circuit terminals in said rows in said mat.

12. An accessory for supporting and supplying energy to a toy train track system as set forth in claim 1 in which said last mentioned means comprise flexible tape members carrying mastic on one surface thereof, a flexible electrically conductive ribbon secured to the mastic surface of said tape, and engaging means connected at one end of said tape for electrically connecting said ribbon to a selected portion of the train track system, and the other end of said tape being secured to said mat by the mastic surface to electrically connect the conductive ribbon to a selected circuit terminal.

13. An accessory for supporting and supplying energy to a toy track system requiring individual electrical circuits comprising a flexible roll-up mat-like structure of insulation material, circuit terminals distributed over the upper surface of said mat, a pair of projections on one marginal edge of said mat, a single projection on another marginal edge of the mat, contact members supported in spaced positions adjacent the marginal edges of each of said projections, electrical circuit leads extending from said circuit terminals and terminating in the contact members located in one of the pair of projections at one end of said mat, electrical circuit leads extending through said mat and connected at one end with the contact members located in the other projection of said pair of projections at the first mentioned marginal edge of said mat, said last mentioned circuit leads terminating in the contact members located in the single projection on the other marginal edge of said mat, means for electrically energizing said circuit leads with electric power, and flexible roll-up mat-like structure being unrollable from a substantially cylindrical roll storage position into a flat plane upon a supporting surface for mounting a toy train track system assembly on the upper surface thereof adjacent said circuit terminals and means extending from said toy track system assembly to said circuit terminals for applying electric power to said toy track system assembly from said terminals.

14. An accessory for supporting and supplying power to toy train track systems comprising a flexible roll-up mat of insulation material having substantial width and length and being unrollable from a roll-up position to a flat position on a supporting surface for supporting a toy train track layout system, an array of contact members adjacent one marginal edge of said mat, leads extending through said mat from said contact members and terminating in circuit terminals in the surface of said mat in spaced positions forming spaced paths on the surface of said mat for the erection therebetween of the toy train track sections supported on said mat, and flexible electrical connectors extending from said toy train track sections to the circuit terminals in the surface of said mat, and means for supplying electric power and control information signals to the toy train track system through said contact members adjacent one marginal edge of said mat.

15. An accessory for supporting and supplying energy to a toy train track system comprising, a flexible mat-like structure of insulation material having substantial width and length and capable of being rolled to reduce the size thereof, said flexible mat-like structure when unrolled into a substantially flat plane upon a supporting surface forming a supporting base adapted to support a toy train track system on the upper surface thereof, a plurality of exposed electrical circuit terminals distributed over the upper surface of said mat to provide circuit connections for the train track system, and electrical circuit leads extending from said terminals and terminating in individual contact elements adjacent a marginal edge of said mat and being adapted to be connected with a source of power.

References Cited in the file of this patent

UNITED STATES PATENTS

| | | |
|---|---|---|
| 1,911,243 | Rosenthal | May 30, 1933 |
| 1,914,116 | Ford | June 13, 1933 |
| 2,068,403 | Ekstrom | Jan. 19, 1937 |
| 2,079,251 | Haupt | May 4, 1937 |
| 2,265,965 | Frisbie | Dec. 9, 1941 |
| 2,537,281 | Roshak | Jan. 9, 1951 |
| 2,591,152 | Hewett | Apr. 1, 1952 |
| 2,616,630 | Michele | Nov. 4, 1952 |
| 2,685,844 | Short | Aug. 10, 1954 |
| 2,838,173 | Emery | June 10, 1958 |
| 2,941,662 | Osberg | June 21, 1960 |
| 2,969,919 | Kornberg | Jan. 31, 1961 |